United States Patent

Kobayashi

Patent Number: 4,497,546
Date of Patent: Feb. 5, 1985

[54] WIDE-FIELD EYEPIECE

[75] Inventor: Yuko Kobayashi, Hachiooji, Japan

[73] Assignee: Olympus Optical Co., Ltd., Tokyo, Japan

[21] Appl. No.: 483,278

[22] Filed: Apr. 8, 1983

[30] Foreign Application Priority Data

Apr. 19, 1982 [JP] Japan ................................. 57-64068

[51] Int. Cl.³ .................... G02B 9/34; G02B 25/00
[52] U.S. Cl. ........................... 350/410; 350/469
[58] Field of Search .......................... 350/410, 469

[56] References Cited

U.S. PATENT DOCUMENTS 3,623,791  11/1971  Uetake ............................. 350/410

Primary Examiner—John K. Corbin
Assistant Examiner—Rebecca D. Gass
Attorney, Agent, or Firm—Cushman, Darby & Cushman

[57] ABSTRACT

A wide-field eyepiece comprising a first, second and third lens components, the first lens component being a positive cemented doublet consisting of a negative lens and a positive lens, the second lens component being a negative cemented doublet consisting of a negative lens and a positive lens, the third lens component comprising at least two lens elements and having positive refractive power as a whole, the wide-field eyepiece having a long eyepoint distance and favorably corrected aberrations.

6 Claims, 5 Drawing Figures

WIDE-FIELD EYEPIECE

BACKGROUND OF THE INVENTION (a) Field of the Invention

The present invention relates to a wide-field eyepiece with a long eyepoint distance.

(b) Description of the Prior Art

Up to the present, it is considered that the optimum eyepoint distance of microscope eyepieces is 14 to 15 mm. For example, the eyepiece disclosed in Japanese published examined patent application No. 41508/71 is known as an eyepiece comparatively resembling the eyepiece according to the present invention. The eyepoint distance of said eyepiece is 14.6 mm. However, for a person who wears a pair of glasses, the distance from the eyepiece to his eye is larger than the distance from the lens of his glasses to his eye. Therefore, when using an eyepiece with the above-mentioned eyepoint distance, such inconvenience occurs for some persons that he cannot bring his eye properly to the position of eyepoint of the eyepiece. Besides, the above-mentioned known eyepiece has such disadvantage that lateral chromatic aberration of the lens system as a whole is overcorrected when it is combined with a microscope objective. Moreover, as the above-mentioned eyepiece has large spherical aberration of pupil, it has such disadvantage that eclipse of field occurs when the position of observer's eye is deviated forward or backward from the proper eyepoint position of the eyepiece though such eclipse of field does not occur as far as the observer puts his eye properly in the eyepoint position of the eyepiece.

SUMMARY OF THE INVENTION

It is, therefore, a primary object of the present invention to provide a wide-field eyepiece with inside focus with which aberrations of the optical system as a whole are favourably corrected when said eyepiece is combined with an objective, said wide-field eyepiece being arranged that especially spherical aberration of pupil thereof is made small so that eclipse of field is not caused even when the position of observer's eye is somewhat deviated from the eyepoint position of the eyepiece and, moreover, arranged to have a long eyepoint distance.

The eyepiece according to the present invention is arranged as a lens system with three-component lens configuration, wherein a glass material with high refractive index is used for the positive lens arranged on the eye side in the lens system in order to as far as possible minimize aberrations to be caused when the eyepoint distance is made long, spherical aberration of the image of the exit pupil of the objective, i.e., spherical aberration of pupil, is limited to a small value within 0.5 mm and the eyepoint distance is thereby made as 19 to 20 mm, i.e., more than 4 mm longer compared with the known eyepiece. When, however, the eyepoint distance becomes longer than 20 mm, it becomes inconvenient for observation because of fine movement of the observer's head during observation. Besides, the eyepoint position means the position where the image of the exit pupil of the objective is formed by the eyepiece. Therefore, when spherical aberration of pupil becomes large, rays coming out of the eyepiece do not converge into one point but form a circle of confusion having a certain diameter. As a result, the observer's eye cannot accomodate all of the rays and, consequently, eclipse of field occurs.

The eyepiece according to the present invention is arranged to make spherical aberration of pupil extremely small as described in the above. Therefore, in spite of the fact that it ensures a wide field, i.e., field number of 26.5, it does not cause eclipse of field even when the position of the observer's eye is somewhat deviated from the eyepoint position.

Besides, for a microscope objective with high magnification, it is difficult to completely eliminate lateral chromatic aberration. Therefore, to correct lateral chromatic aberration which remains uncorrected, the eyepiece should be arranged to have overcorrected lateral chromatic aberration.

The eyepiece according to the present invention is arranged to cause lateral chromatic aberration by arranging that Abbe's numbers of lens elements constituting the first lens component, which is a cemented doublet, become different from each other and to thereby correct lateral chromatic aberration of the lens system as a whole favourably when said eyepiece is combined with an objective.

Based on the content described so far, the eyepiece according to the present invention is arranged to have lens configuration as shown in FIG. 1. That is, the eyepiece according to the present invention comprises a first lens component I, a second lens component II and a third lens component III in the order from the objective side, the first lens component I being a positive cemented doublet consisting of a negative lens and a positive lens, the second lens component II being a negative cemented doublet consisting of a negative lens and a positive lens, the third lens component III being arranged as a lens component comprising a plural number of lens elements and having positive refractive power as a whole wherein the lens element located on the eye side is arranged as a positive meniscus lens which is concave toward the eye side, the eyepiece according to the present invention being further arranged to fulfill the following conditions:

(1) $n_6 \geq 1.75$
(2) $(n_3 - n_4) \geq 0.1$
(3) $-0.8f \geq r_4 \geq -1.2f$
(4) $52 \geq \nu_2 \geq 36$ wherein reference symbol $n_6$ represents the refractive index of the lens element arranged on the eye side in the third lens component III, reference symbols $n_3$ and $n_4$ respectively represent refractive indices of respective lens elements constituting the second lens component II, reference symbol $r_4$ represents the radius of curvature of the lens surface on the objective side in the second lens component II, reference symbol $\nu_2$ represents Abbe's number of the lens element arranged on the eye side in the first lens component I, and reference symbol f represents the focal length of the eyepiece.

Out of respective conditions shown in the above, the condition (1) is required for making the eyepoint distance long. If $n_6$ becomes smaller than 1.75, spherical aberration of pupil, which occurs when the eyepoint distance is made long, becomes larger and it is impossible to correct it.

The condition (2) defines the difference between refractive indices of the negative lens and positive lens constituting the second lens component II. If said difference becomes smaller than 0.1, the correcting effect for spherical aberration of pupil becomes weak. Besides, distortion of the lens system as a whole when combined with an objective will not be corrected satisfactorily.

The condition (3) is required for ensuring the flatness of image. If $r_4$ becomes smaller than the lower limit of the condition (3), curvature of field becomes large and it is impossible to correct is satisfactorily. If $r_4$ becomes larger than the upper limit of the condition (3), the astigmatic difference becomes large and, moreover, it becomes difficult to make the eyepoint distance long.

The condition (4) is established for the purpose of causing lateral chromatic aberration by using a glass material with small Abbe's number for the positive lens in the first lens component I and a glass material with large Abbe's number for the negative lens in the first lens component I in order to thereby correct lateral chromatic aberration of the lens system as a whole including an objective. In other words, it is so arranged that Abbe's number of said positive lens fulfills the condition (4). If $\nu_2$ becomes smaller than the lower limit of the condition (4), lateral chromatic aberration of the lens system as a whole will be overcorrected and, especially, it becomes impossible to correct deviation of g-line in the marginal portion. If $\nu_2$ becomes larger than the upper limit of the condition (4), lateral chromatic aberration will be undercorrected and it becomes impossible to correct lateral chromatic aberration caused by the objective.

DETAILED DESCRIPTION OF THE PREFERRED EMBODIMENTS

Now, preferred embodiments of the eyepiece according to the present invention described so far are shown below.

```
Embodiment 1
r1 = −139.822
    d1 = 2.30      n1 = 1.56873    ν1 = 63.16
r2 = 22.850
    d2 = 7.20      n2 = 1.70154    ν2 = 41.24
r3 = −64.729
    d3 = 21.29
r4 = −29.247
    d4 = 3.00      n3 = 1.76182    ν3 = 26.52
r5 = 21.633
    d5 = 9.80      n4 = 1.56873    ν4 = 63.16
r6 = −28.463
    d6 = 1.30
r7 = 47.518
    d7 = 4.00      n5 = 1.64000    ν5 = 60.09
r8 = −74.266
    d8 = 0.20
r9 = 21.330
    d9 = 4.51      n6 = 1.80400    ν6 = 46.57
r10 = 49.878
    f = 25 mm, field number = 26.5
    magnification = 10X, eye point distance = 19.44 mm Embodiment 2
r1 = −147.686
    d1 = 2.91      n1 = 1.56873    ν1 = 63.16
r2 = 24.261
    d2 = 5.81      n2 = 1.70154    ν2 = 41.24
r3 = −56.213
    d3 = 20.78
r4 = −23.628
    d4 = 3.11      n3 = 1.72825    ν3 = 28.46
r5 = 21.514
    d5 = 8.94      n4 = 1.56873    ν4 = 63.16
r6 = −25.885
    d6 = 0.90
r7 = 60.934
    d7 = 3.95      n5 = 1.64000    ν5 = 60.09
r8 = −63.816
    d8 = 0.20
r9 = 20.705
    d9 = 3.80      n6 = 1.75700    ν6 = 47.87
r10 = 61.245
    f = 25 mm, field number = 26.5
    magnification = 10X, eye point distance = 20 mm Embodiment 3
r1 = −134.440
    d1 = 2.30      n1 = 1.56873    ν1 = 63.16
r2 = 24.592
    d2 = 7.00      n2 = 1.72000    ν2 = 46.03
r3 = −55.879
    d3 = 20.80
r4 = −21.374
    d4 = 3.00      n3 = 1.76182    ν3 = 26.52
r5 = 24.274
    d5 = 8.90      n4 = 1.56873    ν4 = 63.16
r6 = −23.606
    d6 = 0.80
r7 = 58.802
    d7 = 4.00      n5 = 1.64000    ν5 = 60.09
r8 = −57.535
    d8 = 0.20
r9 = 21.194
    d9 = 3.80      n6 = 1.80400    ν6 = 46.57
r10 = 55.138
    f = 25 mm, field number = 26.5
    magnification = 10X, eye point distance = 20 mm Embodiment 4
r1 = −171.991
    d1 = 2.89      n1 = 1.56873    ν1 = 63.16
r2 = 27.122
    d2 = 7.09      n2 = 1.70154    ν2 = 41.24
r3 = −53.937
    d3 = 20.76
r4 = −22.543
    d4 = 3.12      n3 = 1.76182    ν3 = 26.52
r5 = 25.059
    d5 = 8.93      n4 = 1.56873    ν4 = 63.16
r6 = −25.059
    d6 = 0.20
r7 = 62.252
    d7 = 4.23      n5 = 1.69680    ν5 = 55.52
r8 = −62.252
    d8 = 0.20
r9 = 21.123
    d9 = 3.80      n6 = 1.80400    ν6 = 46.57
r10 = 53.228
    f = 25 mm, field number = 26.5
    magnification = 10X, eye point distance = 19.44 mm
```

In embodiments shown in the above, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

Figure 1:
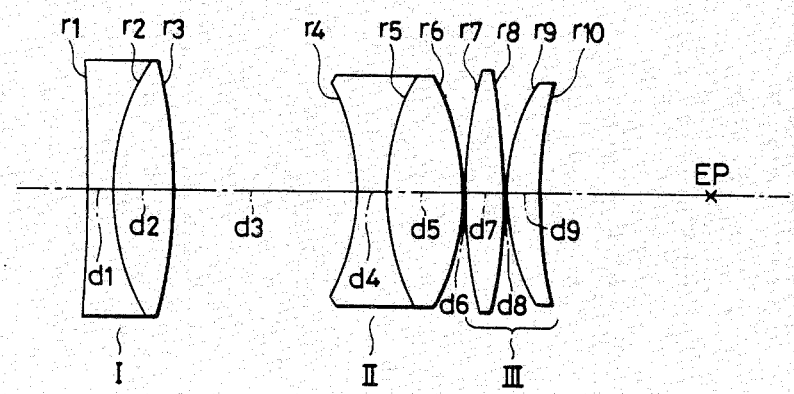
FIG. 1 shows a sectional view of the eyepiece according to the present invention.
Figure 2:
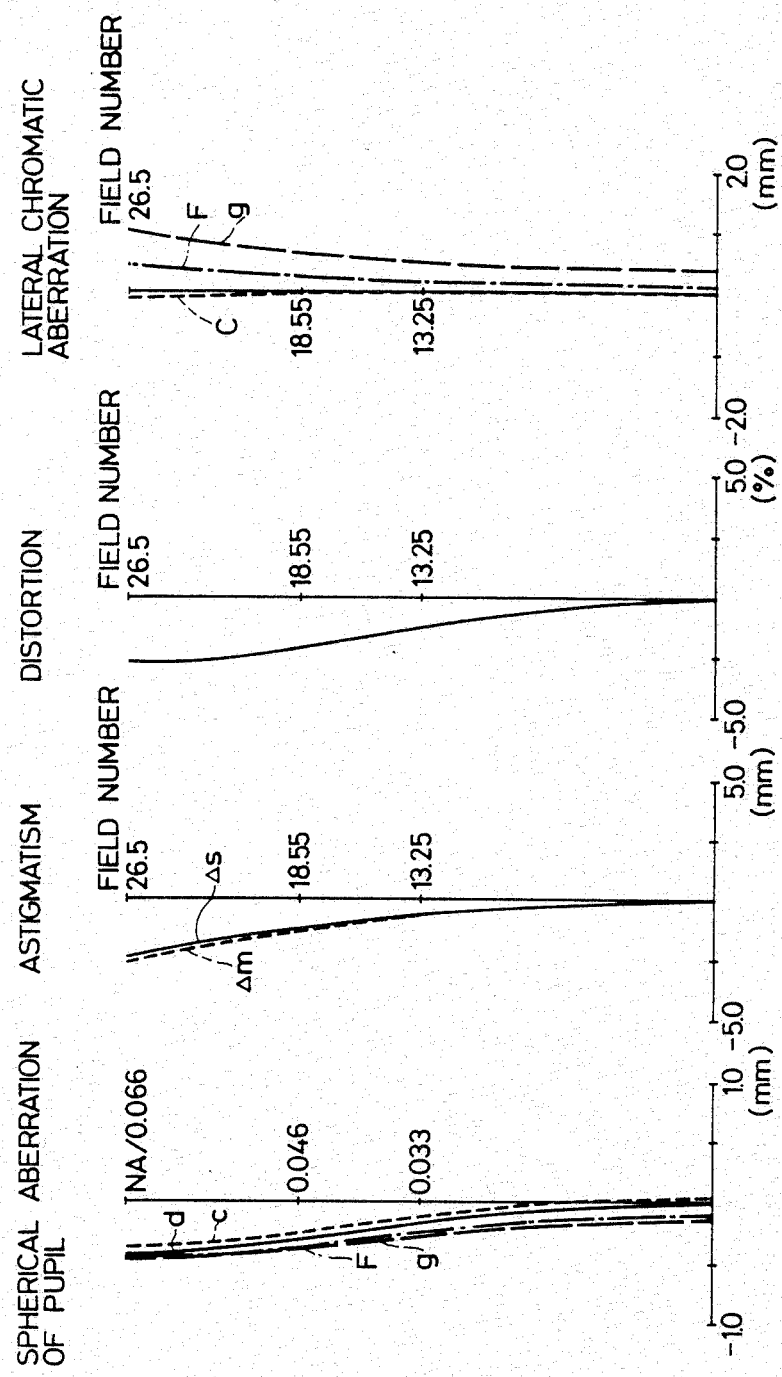
FIGS. 2 through 5 respectively show graphs illustrating aberration curves of Embodiments 1 through 4 of the eyepiece according to the present invention.
Figure 3:
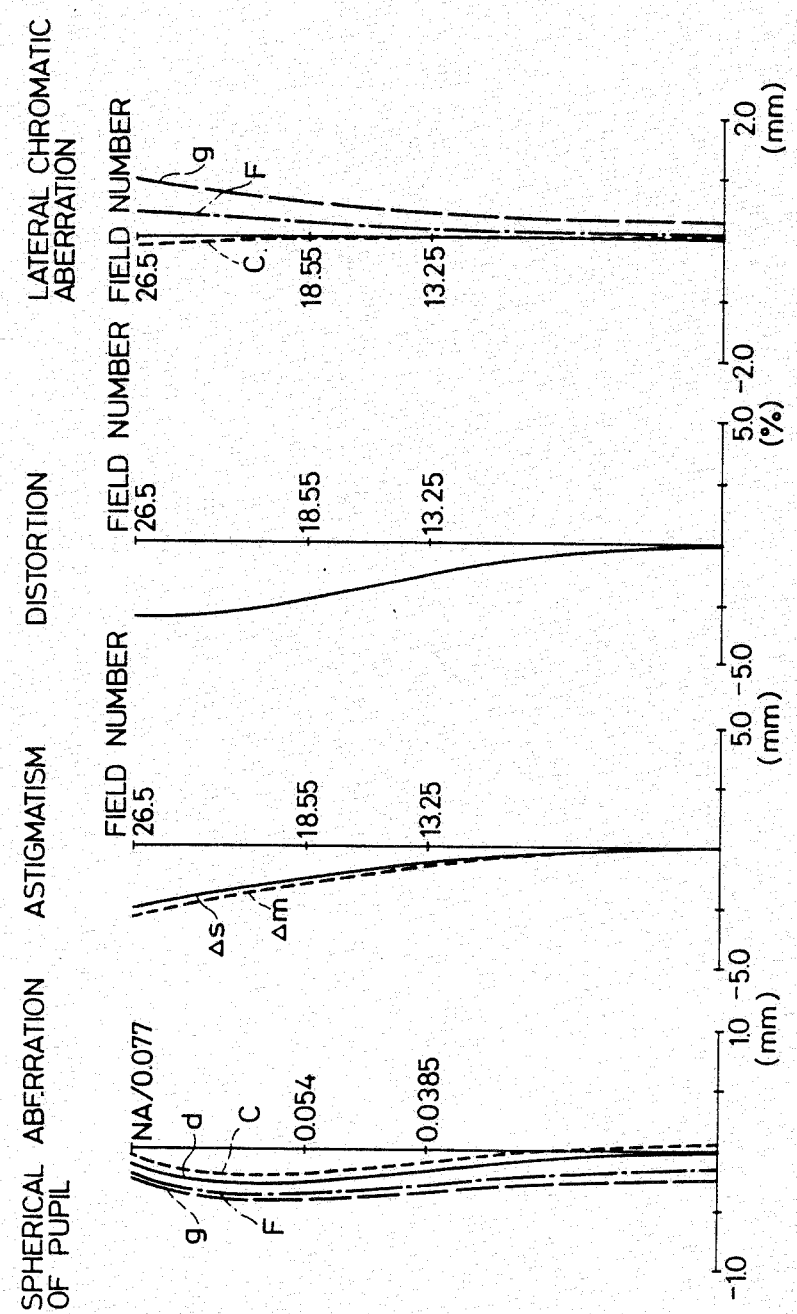
Figure 4:
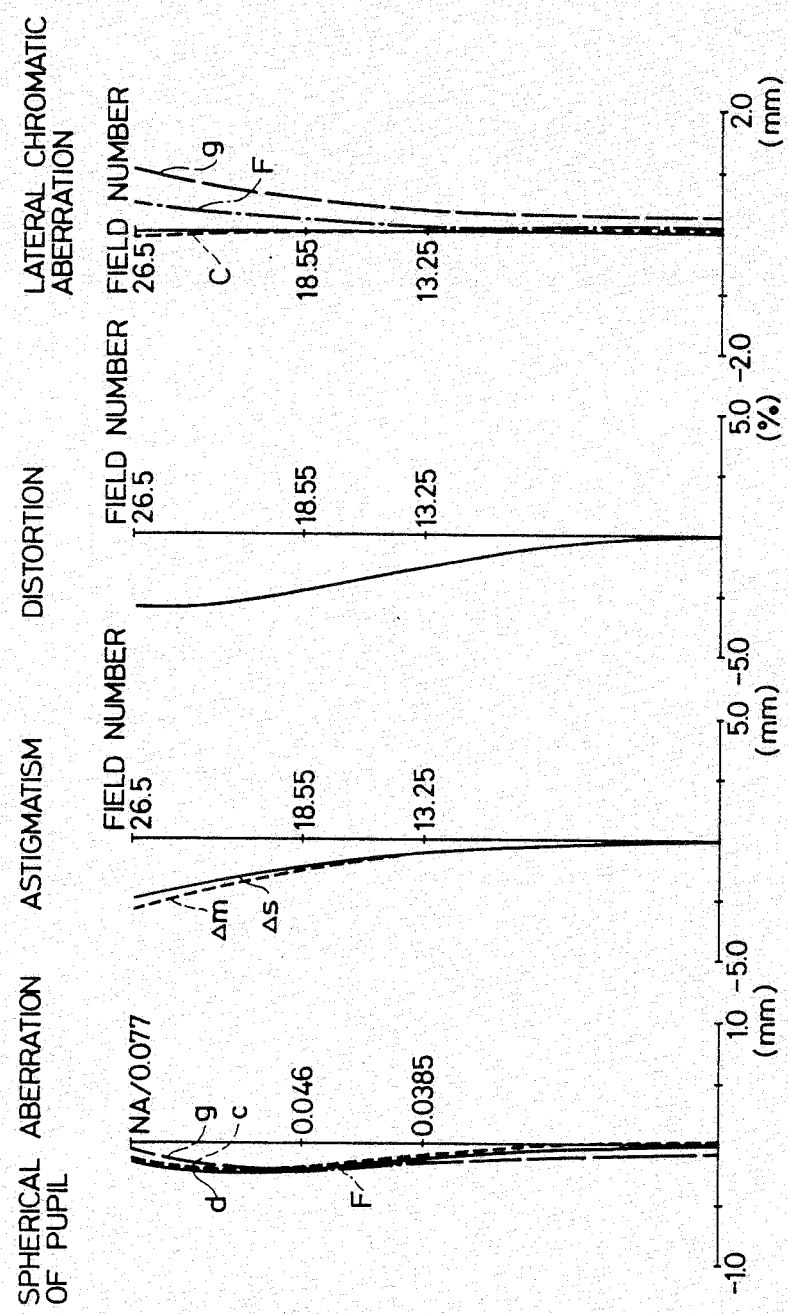
Figure 5:
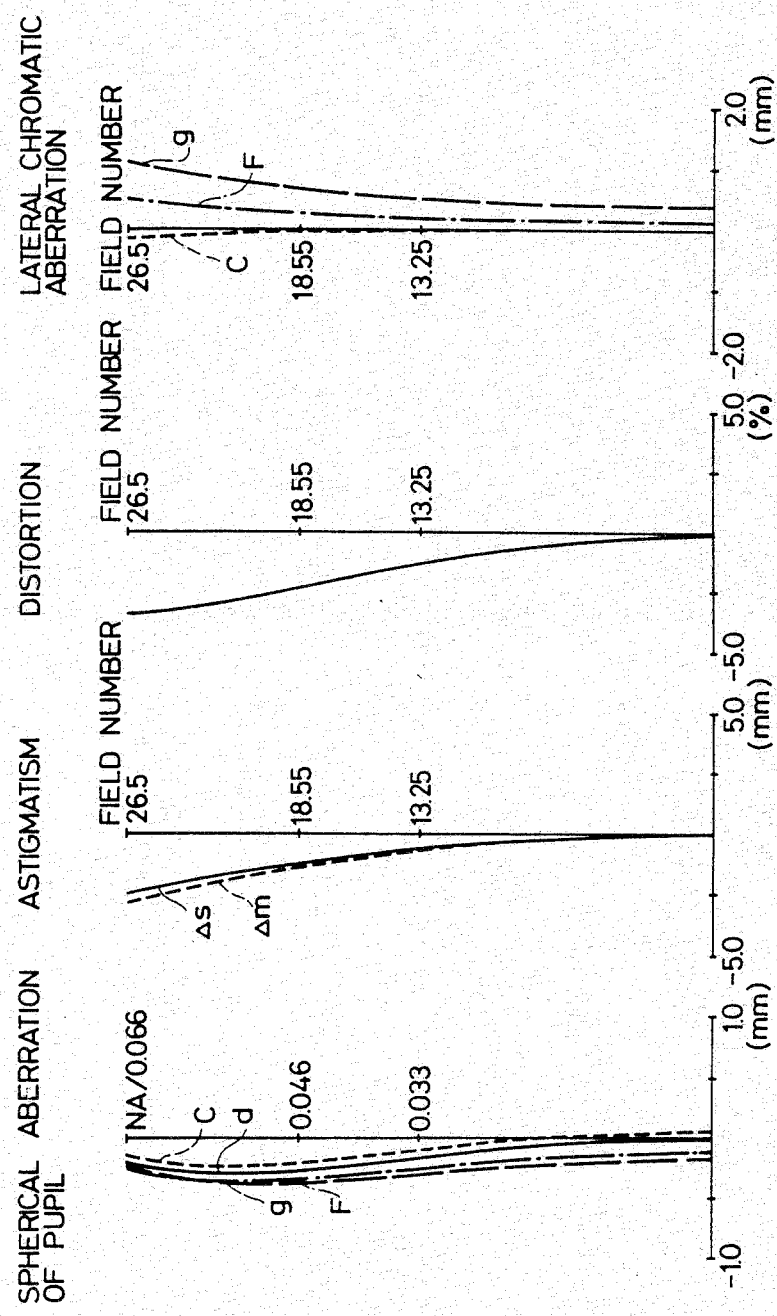

All of embodiments shown in the above have the lens configuration shown in FIG. 1. That is, the first lens component I is a cemented doublet consisting of a biconcave lens and a biconvex lens, the second lens component II is a cemented doublet consisting of a biconcave lens and a biconvex lens, and the third lens component III comprises two lens elements, i.e., a biconvex lens and a positive meniscus lens which is arranged to be concave toward the eye side. States of aberrations of these embodiments are shown in FIGS. 2 through 5.

Except spherical aberration of pupil, all aberration curves shown in these figures represent those which are obtained when an image is formed by rays that enter from the eye side (surface $r_{10}$ side).

As it is evident from the embodiments shown in the above, the eyepiece according to the present invention have the eyepoint distance of 19 mm or more and, moreover, spherical aberration of the image of exit pupil of the objective at the eyepoint is corrected very favourably.

I claim:

1. A wide-field eyepiece comprising a first, second and third lens components wherein said first lens component is a positive cemented doublet consisting of a negative lens and a positive lens, said second lens component is a negative cemented doublet consisting of a negative lens and a positive lens, and said third lens component comprises at least two lens elements and has positive refractive power as a whole, the lens element located on the eye side in said third lens component being a positive meniscus lens arranged to be concave toward the eye side, said wide-field eyepiece being arranged to fulfill the following conditions:

(1)  $n_6 \geq 1.75$
 (2)  $(n_3 - n_4) \geq 0.1$
 (3)  $-0.8f \geq r_4 \geq -1.2f$
 (4)  $52 \geq \nu_2 \geq 36$ wherein reference symbols $n_3$ and $n_4$ respectively represent refractive indices of respective lens elements constituting the second lens component, reference symbol $n_6$ represents the refractive index of the lens element arranged on the eye side in the third lens component, reference symbol $r_4$ represents the radius of curvature of the lens surface located on the first lens component side in the second lens component, reference symbol $\nu_2$ represents Abbe's number of the lens element arranged on the second lens component side in the first lens component, and reference symbol $f$ represents the focal length of the lens system as a whole.

2. A wide-field eyepiece according to claim 1 wherein said third lens component comprises a biconvex lens and a positive meniscus lens arranged to be concave toward the eye side.

3. A wide-field eyepiece according to claim 2, in which said wide-field eyepiece has the following numerical data:

| | | |
|---|---|---|
| $r_1 = -139.822$ | | |
| $d_1 = 2.30$ | $n_1 = 1.56873$ | $\nu_1 = 63.16$ |
| $r_2 = 22.850$ | | |
| $d_2 = 7.20$ | $n_2 = 1.70154$ | $\nu_2 = 41.24$ |
| $r_3 = -64.729$ | | |
| $d_3 = 21.29$ | | |
| $r_4 = -29.247$ | | |
| $d_4 = 3.00$ | $n_3 = 1.76182$ | $\nu_3 = 26.52$ |
| $r_5 = 21.633$ | | |
| $d_5 = 9.80$ | $n_4 = 1.56873$ | $\nu_4 = 63.16$ |
| $r_6 = -28.463$ | | |
| $d_6 = 1.30$ | | |
| $r_7 = 47.518$ | | |
| $d_7 = 4.00$ | $n_5 = 1.64000$ | $\nu_5 = 60.09$ |
| $r_8 = -74.266$ | | |
| $d_8 = 0.20$ | | |
| $r_9 = 21.330$ | | |
| $d_9 = 4.51$ | $n_6 = 1.80400$ | $\nu_6 = 46.57$ |
| $r_{10} = 49.878$ | | |
| $f = 25$ mm, field number $= 26.5$ | | |
| magnification $= 10X$, eye point distance $= 19.44$ mm | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

4. A wide-field eyepiece according to claim 2, in which said wide-field eyepiece has the following numerical data:

| | | |
|---|---|---|
| $r_1 = -147.686$ | | |
| $d_1 = 2.91$ | $n_1 = 1.56873$ | $\nu_1 = 63.16$ |
| $r_2 = 24.261$ | | |
| $d_2 = 5.81$ | $n_2 = 1.70154$ | $\nu_2 = 41.24$ |
| $r_3 = -56.213$ | | |
| $d_3 = 20.78$ | | |
| $r_4 = -23.628$ | | |
| $d_4 = 3.11$ | $n_3 = 1.72825$ | $\nu_3 = 28.46$ |
| $r_5 = 21.514$ | | |
| $d_5 = 8.94$ | $n_4 = 1.56873$ | $\nu_4 = 63.16$ |
| $r_6 = -25.885$ | | |
| $d_6 = 0.90$ | | |
| $r_7 = 60.934$ | | |
| $d_7 = 3.95$ | $n_5 = 1.64000$ | $\nu_5 = 60.09$ |
| $r_8 = -63.816$ | | |
| $d_8 = 0.20$ | | |
| $r_9 = 20.705$ | | |
| $d_9 = 3.80$ | $n_6 = 1.75700$ | $\nu_6 = 47.87$ |
| $r_{10} = 61.245$ | | |
| $f = 25$ mm, field number $= 26.5$ | | |
| magnification $= 10X$, eye point distance $= 20$ mm | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

5. A wide-field eyepiece according to claim 2, in which said wide-field eyepiece has the following numerical data:

| | | |
|---|---|---|
| $r_1 = -134.440$ | | |
| $d_1 = 2.30$ | $n_1 = 1.56873$ | $\nu_1 = 63.16$ |
| $r_2 = 24.592$ | | |
| $d_2 = 7.00$ | $n_2 = 1.72000$ | $\nu_2 = 46.03$ |
| $r_3 = -55.879$ | | |
| $d_3 = 20.80$ | | |
| $r_4 = -21.374$ | | |
| $d_4 = 3.00$ | $n_3 = 1.76182$ | $\nu_3 = 26.52$ |
| $r_5 = 24.274$ | | |
| $d_5 = 8.90$ | $n_4 = 1.56873$ | $\nu_4 = 63.16$ |
| $r_6 = -23.606$ | | |
| $d_6 = 0.80$ | | |
| $r_7 = 58.802$ | | |
| $d_7 = 4.00$ | $n_5 = 1.64000$ | $\nu_5 = 60.09$ |
| $r_8 = -57.535$ | | |
| $d_8 = 0.20$ | | |
| $r_9 = 21.194$ | | |
| $d_9 = 3.80$ | $n_6 = 1.80400$ | $\nu_6 = 46.57$ |
| $r_{10} = 55.138$ | | |
| $f = 25$ mm, field number $= 26.5$ | | |
| magnification $= 10X$, eye point distance $= 20$ mm | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

6. A wide-field eyepiece according to claim 2, in which said wide-field eyepiece has the following numerical data:

| | | |
|---|---|---|
| $r_1 = -171.991$ | | |
| $d_1 = 2.89$ | $n_1 = 1.56873$ | $\nu_1 = 63.16$ |
| $r_2 = 27.122$ | | |
| $d_2 = 7.09$ | $n_2 = 1.70154$ | $\nu_2 = 41.24$ |
| $r_3 = -53.937$ | | |
| $d_3 = 20.76$ | | |
| $r_4 = -22.543$ | | |
| $d_4 = 3.12$ | $n_3 = 1.76182$ | $\nu_3 = 26.52$ |
| $r_5 = 25.059$ | | |
| $d_5 = 8.93$ | $n_4 = 1.56873$ | $\nu_4 = 63.16$ |
| $r_6 = -25.059$ | | |
| $d_6 = 0.20$ | | |
| $r_7 = 62.252$ | | |
| $d_7 = 4.23$ | $n_5 = 1.69680$ | $\nu_5 = 55.52$ |
| $r_8 = -62.252$ | | |
| $d_8 = 0.20$ | | |
| $r_9 = 21.123$ | | |
| $d_9 = 3.80$ | $n_6 = 1.80400$ | $\nu_6 = 46.57$ |
| $r_{10} = 53.228$ | | |
| $f = 25$ mm, field number $= 26.5$ | | |
| magnification $= 10X$, eye point distance $= 19.44$ mm | | | wherein reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

* * * * *